(12) United States Patent
Patient et al.

(10) Patent No.: US 8,511,155 B2
(45) Date of Patent: Aug. 20, 2013

(54) DEVICES INCLUDING A MECHANOCHROMATIC MATERIAL FOR INDICATING PRESSURE

(75) Inventors: Christopher Simon Patient, Midlands (GB); Christopher John Wheater, York (GB)

(73) Assignee: Norgren Limited, Staffordshire (GB)

( * ) Notice: Subject to any disclaimer, the term of this patent is extended or adjusted under 35 U.S.C. 154(b) by 176 days.

(21) Appl. No.: 12/682,999

(22) PCT Filed: Oct. 19, 2007

(86) PCT No.: PCT/GB2007/003996
§ 371 (c)(1),
(2), (4) Date: Apr. 14, 2010

(87) PCT Pub. No.: WO2009/050412
PCT Pub. Date: Apr. 23, 2009

(65) Prior Publication Data
US 2010/0236682 A1    Sep. 23, 2010

(51) Int. Cl.
*G01M 17/02* (2006.01)
(52) U.S. Cl.
USPC ............................................................. 73/146
(58) Field of Classification Search
USPC ............................................. 73/146–146.8
See application file for complete search history.

(56) References Cited

U.S. PATENT DOCUMENTS

| | | | |
|---|---|---|---|
| 4,131,149 A | 12/1978 | Roberts et al. | |
| 4,355,898 A | 10/1982 | Dakin | |
| 4,426,881 A * | 1/1984 | Magoulick | 73/146.8 |
| 4,721,769 A | 1/1988 | Rubner | |
| 5,189,979 A | 3/1993 | Popenoe | |
| 5,990,199 A | 11/1999 | Bealing et al. | |
| 6,168,566 B1 | 1/2001 | Lia et al. | |
| 6,468,759 B1 | 10/2002 | Charych | |
| 6,471,761 B2 | 10/2002 | Fan et al. | |
| 6,588,264 B1 | 7/2003 | Johnson | |
| 6,609,865 B2 | 8/2003 | Daigneault | |
| 6,668,661 B2 | 12/2003 | Rider | |
| 6,817,311 B1 | 11/2004 | Treen et al. | |
| 6,911,903 B2 | 6/2005 | Gladstone | |

(Continued)

FOREIGN PATENT DOCUMENTS

| | | |
|---|---|---|
| CN | 2100335 U | 1/1992 |
| CN | 1338904 A | 3/2002 |
| EP | 1715319 A2 | 10/2006 |
| GB | 2353864 A | 3/2001 |
| WO | 0044259 | 8/2000 |
| WO | 2005045389 A1 | 5/2005 |

OTHER PUBLICATIONS

RH Engler, Chr Klein and O Trinks, "Pressure sensitive paint systems for pressure distribution measurements in wind tunnels and turbomachines", Meas. Sci. Technol. Nov. 2000 pp. 1077-1085.
Stephen H. Foulger, Ping Jiang, Amanda Lattam, Dennis W. Smith, Jr., John Ballato, David E. Dausch, Sonia Grego, and Brian R. Stoner, "Photonic Crystal Composites with Reversible High-Frequency Stop Band Shifts", Advanced Materials, 2003, 15., No. 9, May 2, 2003 Wiley-VCH Verlag GmbH & Co. KGaA, Weinheim.
Sandia National Laboratories, "Nano-Scale Mechanochromism", http://www.sandia.gov/surface_science/burns_spm/movies.htm.

*Primary Examiner* — Andre Allen
(74) *Attorney, Agent, or Firm* — The Ollila Law Group LLC

(57) ABSTRACT

The present invention relates to devices that include a mechanochromatic material (10) which changes color according to a pressure exerted on the device. As a result, the mechanochromatic material (10) functions as an indicator of pressure exerted on the device. A user can view the mechanochromatic material (10) to determine whether the pressure exerted on the device exceeds a threshold pressure, whereat a color change will occur in the mechanochromatic material (10).

13 Claims, 4 Drawing Sheets

(56) References Cited

U.S. PATENT DOCUMENTS

| | | |
|---|---|---|
| 7,043,992 B2 | 5/2006 | Bernhard |
| 2003/0039744 A1 | 2/2003 | Fan et al. |
| 2004/0025581 A1* | 2/2004 | Miller .............................. 73/146 |
| 2004/0025582 A1* | 2/2004 | Wiseman et al. ............ 73/146.8 |
| 2004/0261513 A1* | 12/2004 | Wiseman et al. ................ 73/146 |
| 2006/0042366 A1* | 3/2006 | Carrus et al. .................... 73/146 |
| 2007/0050153 A1 | 3/2007 | Brassier et al. |

* cited by examiner

DEVICES INCLUDING A MECHANOCHROMATIC MATERIAL FOR INDICATING PRESSURE

FIELD OF THE INVENTION

The present invention relates to devices that include a visual color indication of a pressure level in the device.

BACKGROUND OF THE INVENTION

Many devices and systems contain pressurized substances, such as fluid and gas. In such devices and systems, measurement or indication of pressure is often desirable. For example, an indication of proper tire pressure is desirable for safety and longevity of the tire and an indication of conduit pressure may be desirable prior to disconnecting the conduit or may allow circuit analysis and diagnosis when the conduit is a component of a pressurized circuit.

Heretofore, pressure in a device or circuit has typically been indicated through use of various gauges known in the art. Such pressure gauges are typically provided with a scale or dial for measuring or indicating pressure. In addition to being costly, performance and accuracy of pressure gauges may be affected by a number of factors, including temperature, leakage, vibration, condensation, fluctuations in pressure, corrosion, and clogging. In situations where a pressure gauge generates inaccurate readings, it may be difficult determine whether the reading is inaccurate, unless one or more other accurate pressure gauges are also used to measure the pressure. Accordingly, pressure gauges may not always be relied on for accurately indicated pressure.

Although pressure gauges that use a scale or dial are common, pressure indicators have been developed that use color to indicate or measure pressure; however, they have not been widely adopted. An example of such a pressure indicator is found in U.S. Pat. No. 5,189,979 to Popenoe (hereinafter referred to as "Popenoe"). In Popenoe, the pressure indicator includes a light absorbing fluid located between a diaphragm and a viewing window. On the side of the diaphragm facing the viewing window, a color indicating area is provided. An increase in pressure causes the diaphragm to flex and the indicator to be displaced toward the viewing window, thereby decreasing the thickness of the light absorbing fluid between the color indicator and the viewing window. As a result the color indicating area may be viewed through the viewing window.

The present invention is directed at devices that include a mechanochromatic material that changes color in response to pressure.

SUMMARY OF THE INVENTION

The scope of the present invention is defined solely by the appended claims, and is not affected to any degree by the statements within this summary.

In one embodiment of the present invention, a tire comprises a pressurized inner surface, an outer surface, and a mechanochromatic material that changes color according to a pressure of the tire.

In another embodiment of the present invention a conduit comprises a pressurized inner surface, an outer surface, and a mechanochromatic material that changes color according to a pressure of the conduit.

ASPECTS

According to one aspect of the present invention, a tire comprises:
a pressurized inner surface;
an outer surface; and
a mechanochromatic material that changes color according to a pressure of the tire.

Preferably, the mechanochromatic material is located on the outer surface (54).

Preferably, the mechanochromatic material is applied as a patch.

Preferably, the mechanochromatic material is applied as a plug.

Preferably, the mechanochromatic material is applied as a coating.

Preferably, the mechanochromatic material is applied as a paint.

Preferably, the mechanochromatic material reversibly changes from one color to another when the amount of pressure exerted on the cavity defining surface exceeds a threshold pressure.

Preferably, the mechanochromatic material is located below the outer surface of the tire.

Preferably, the mechanochromatic material is located below a viewing window included on the tire.

Preferably, a non-mechanochromatic material is applied above the mechanochromatic material.

Preferably, the mechanochromatic material changes color in response to shear stress.

Preferably, the mechanochromatic material changes color in response to normal stress.

According to another aspect of the present invention, a conduit comprises:
a pressurized inner surface;
an outer surface; and
a mechanochromatic material that changes color according to a pressure of the conduit.

Preferably, the mechanochromatic material is located on the outer surface.

Preferably, the mechanochromatic material is applied as a patch.

Preferably, the mechanochromatic material is applied as a plug.

Preferably, the mechanochromatic material is applied as a coating.

Preferably, the mechanochromatic material is applied as a paint.

Preferably, the conduit is extruded from the mechanochromatic material.

Preferably, the mechanochromatic material reversibly changes from the color blue to the color red when the amount of pressure exerted on the cavity defining surface exceeds a threshold pressure.

Preferably, the mechanochromatic material is located below the outer surface of the conduit.

Preferably, the mechanochromatic material is located below a viewing window included on the conduit.

Preferably, a non-mechanochromatic material is applied above the mechanochromatic material.

Preferably, the mechanochromatic material changes color in response to shear stress.

Preferably, the mechanochromatic material changes color in response to normal stress.

DETAILED DESCRIPTION OF THE PRESENTLY PREFERRED EMBODIMENTS

Figure 1:
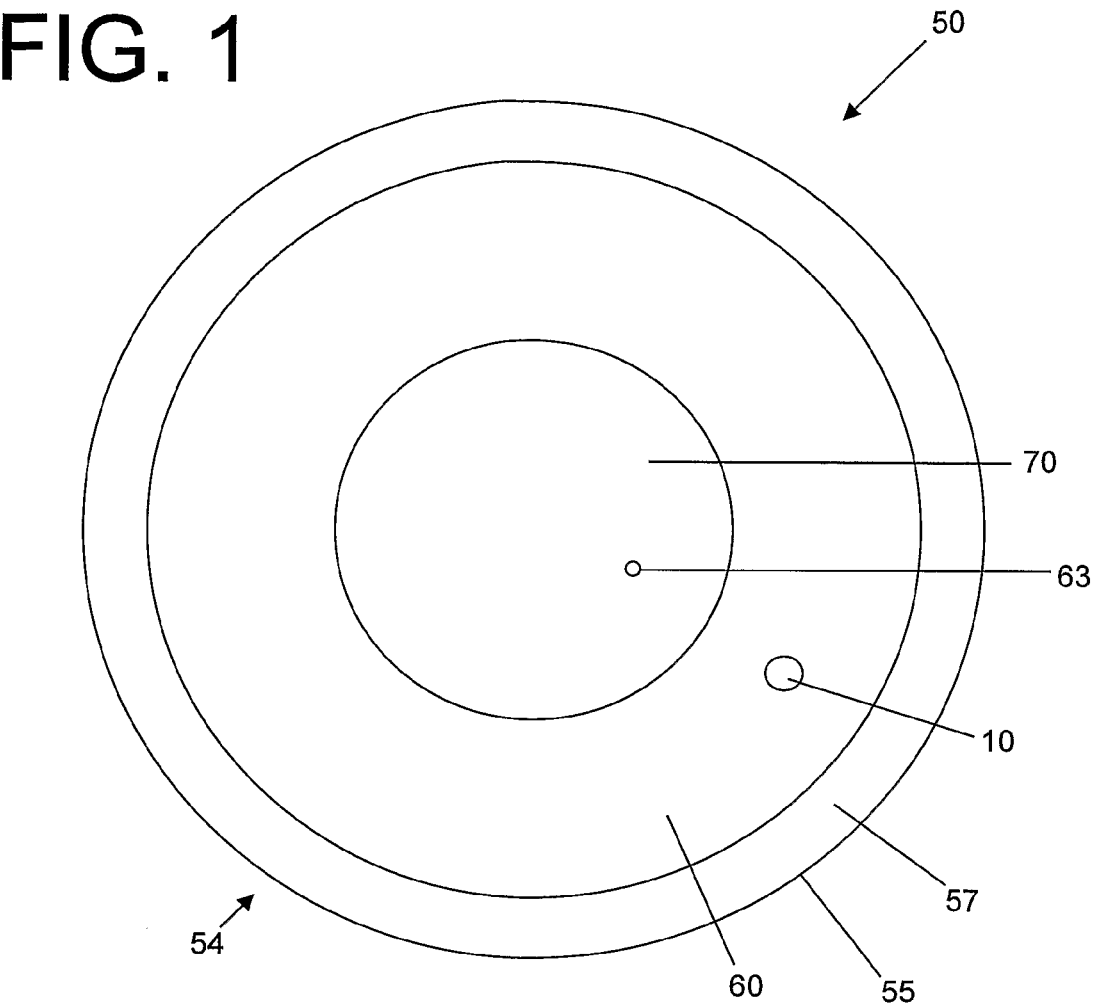
FIG. 1 depicts a side perspective view of a tire that includes a mechanochromatic material.

FIG. 1 depicts a mechanochromatic material 10 configured to function as a pressure indicator on a tire 50. As used herein, a mechanochromatic material 10 is a material wherein the optical absorption of the material in the visible portion of the spectrum may be manipulated by mechanical stress, such as by applying shear or normal stress to the mechanochromatic material 10. In the present embodiment, the mechanochromatic material 10 changes color in response to mechanical shear stress; however, in alternative embodiments the mechanochromatic material may be a material that changes color when subjected to normal stress.

In the present embodiment, the mechanochromatic material 10 includes a conjugated polymer, such as polythiophene, polypyrrole, or a diacetylene polymer, that changes color in response to mechanical stress. The mechanochromatic material 10 preferably includes polydiacetylene (PDA), which exhibits a reversible blue-to-red color transition that may be stimulated by mechanical stress ("mechanochromism"). The mechanochromatic material 10 is preferably provided as a film that includes PDA, which may be a mono-layered film or a multi-layered film, such as, for example, but not limitation, films including 10, 12-pentacosadiynoic acid (PCDA).

Those of ordinary skill in the art will appreciate that it is within the scope of the present invention to utilize other mechanochromatic materials 10. By way of example and not limitation, in alternative embodiments, the mechanochromatic material may include photonic crystals, such as, for example, and not limitation, poly 2-methoxyethyl acrylate (MOEA)-based photonic crystal composite, such as, for example, certain known MOEA-based photonic crystal composites that exhibit a reversible red to yellow to blue color transition depending on the level of mechanical stress. In further alternative embodiments, the mechanochromatic material may include liquid crystal cholesterol esters or polymerized crystalline colloidal arrays (PCCA), including the PCCA's disclosed in U.S. Patent Publication No. 20030122112. The foregoing materials are examples of possible mechanochromatic materials 10 that may be used within the scope of the present invention; however it is in the scope of the present invention to utilize any mechanochromatic material that is provided with an altered visual appearance in response to a mechanical stress.

Figure 2:
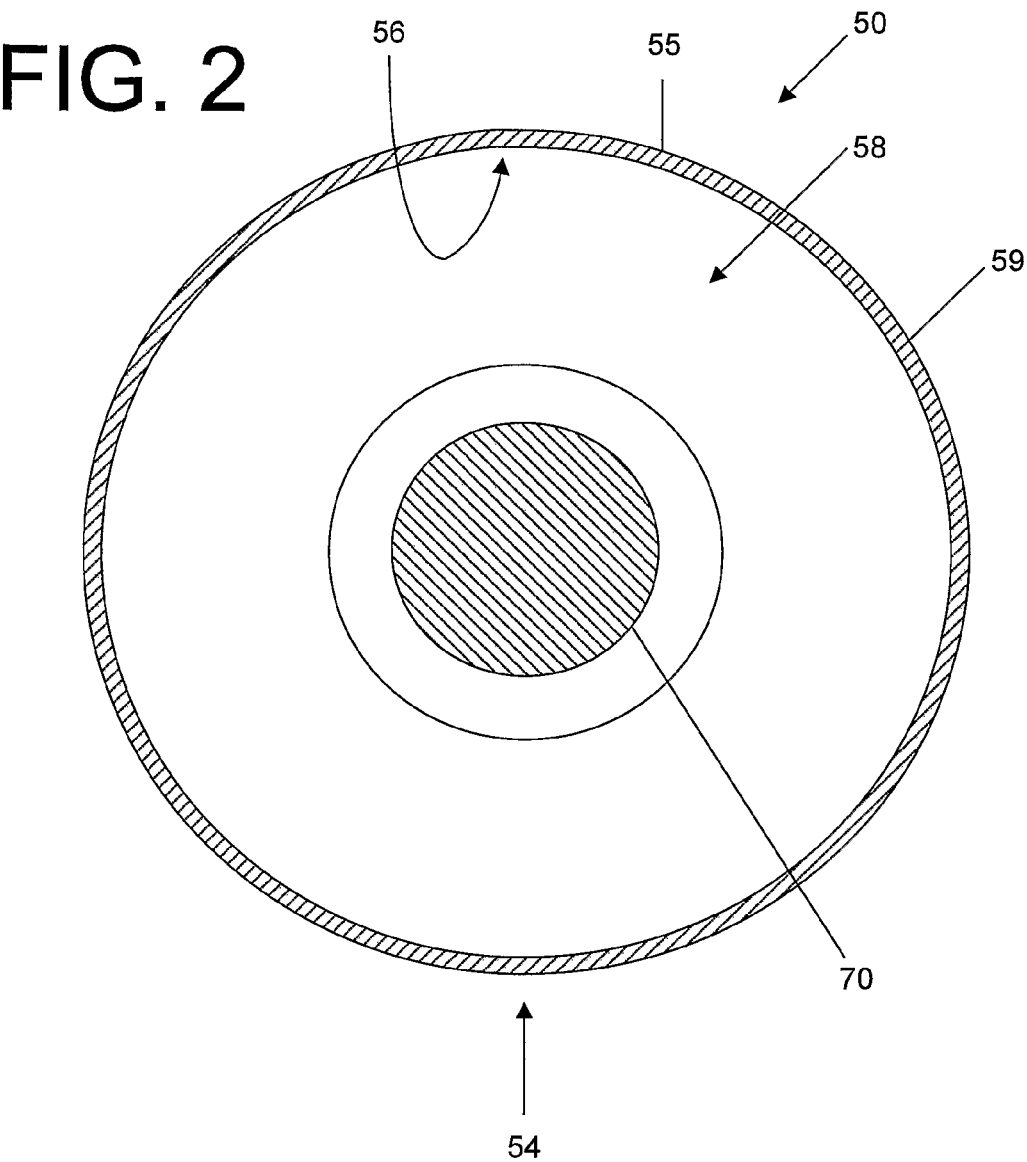
FIG. 2 depicts a sectional view of a tire that includes a mechanochromatic material.
Figure 3:
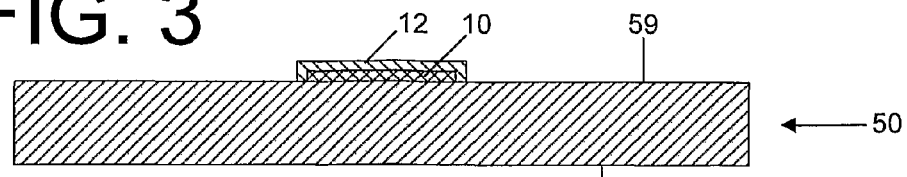
FIG. 3 depicts a sectional view of a tire that includes a mechanochromatic material.
Figure 4:
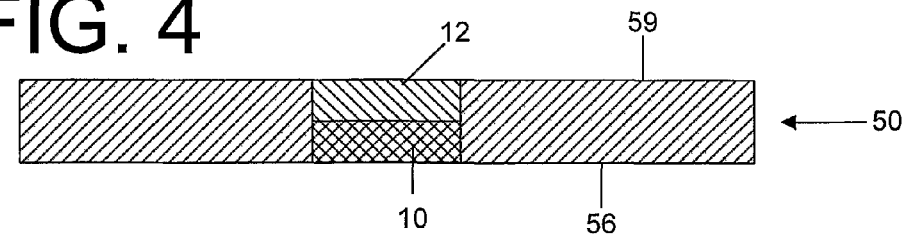
FIG. 4 depicts a sectional view of a tire that includes a mechanochromatic material.

In the embodiment depicted in FIG. 1, the tire 50 is shown located around a hub 70 and provided with an outer surface 54 that includes a tread 55, a shoulder 57, a sidewall 60, and a valve stem 63. Although only one side of the tire 50 is depicted, those of ordinary skill in the art will appreciate that the other side of the tire 50 is provided with a shoulder (not shown) and a side wall (not shown). In the present embodiment, the tire 50 is provided with an inner surface 56 to be pressurized. As shown in FIG. 2, the inner surface 56 defines, at least in part, a cavity 58. In the present embodiment, the tire 50 and the hub 70 define the cavity 58, which is pressurized.

In the present embodiment, at least a portion of the tire 50, preferably, at least a portion of the outer surface 54 is provided with the mechanochromatic material. Although, as depicted, the mechanochromatic material 10 is located on the sidewall 60, those of ordinary skill in the art will appreciate that it is within the scope of the present invention for the mechanochromatic material 10 to be located anywhere so long as the amount of pressure exerted on the cavity defining inner surface 56 effects a mechanical stress on the mechanochromatic material 10, whereby a color change in the mechanochromatic material 10 is effected. By way of example, and not limitation, the mechanochromatic material 10 may be located at least partially on the tread 55; however, since the mechanochromatic material 10 may be viewed more easily if located on the sidewall 60 or shoulder 57, it is preferred that mechanochromatic material 10 be located on one or both of these sections.

Figure 5:
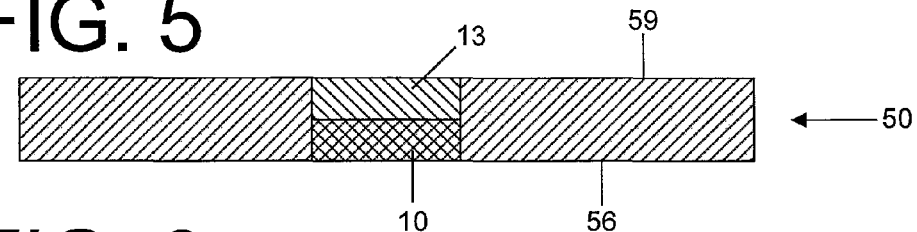
FIG. 5 depicts a sectional view of a tire that includes a mechanochromatic material.
Figure 6:
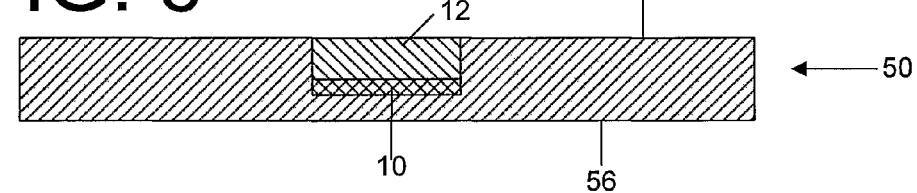
FIG. 6 depicts a sectional view of a tire that includes a mechanochromatic material.
Figure 7:
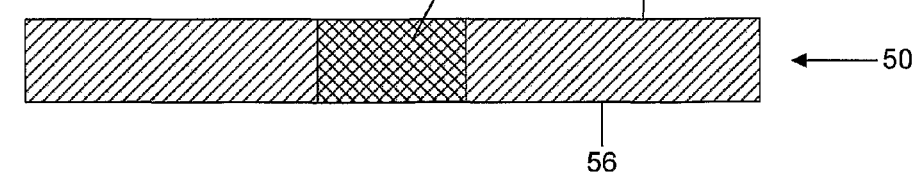
FIG. 7 depicts a sectional view of a tire that includes a mechanochromatic material.
Figure 8:
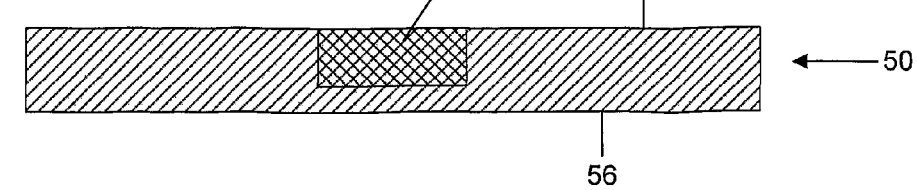
FIG. 8 depicts a sectional view of a tire that includes a mechanochromatic material.

In the present embodiment, the mechanochromatic material 10 may be applied as a patch, a coating, a layer, a paint, or a plug, so long as the mechanochromatic material 10 may be viewed. The mechanochromatic material 10 may be provided with any shape, including, but not limited to, a circle, an oval, a polygon, an irregular shape, a band, a symbol, letter(s), or number(s). Furthermore, although in the present embodiment, the mechanochromatic material 10 is shown applied onto the outer surface 59 of the tire 50, the scope of the present invention is not so limited. By way of example, and not limitation, as shown in FIGS. 4-8, the mechanochromatic material 10 may be located, at least in part, below the outer surface 59 of the tire 50, including as a part of the inner surface 56, so long as the color change may be perceived. Furthermore, it is within the scope of the present invention to apply a non-mechanochromatic material 12, such as, for example, and not limitation, a coating of non-mechanochromatic material 12, above the mechanochromatic material 10 or to locate the mechanochromatic material 10 below a viewing window 13 included on the tire 50, so long as a color change may be perceived. FIGS. 3-8 depict possible arrangements for the mechanochromatic material 10, however, those of ordinary skill in the art will appreciate that other arrangements are contemplated within the scope of the present invention. By way of example, and not limitation, although FIG. 5 shows a viewing window 13 adjacent to the mechanochromatic substance 10, a gap or space may be provided therebetween.

Advantageously, the mechanochromatic material 10 is configured to change color in response to a change in pressure. According to one aspect of the present embodiment, the mechanochromatic material 10 is configured to reversibly change color in response to a change in pressure. According to another aspect of the present embodiment, the mechanochromatic material 10 is one color when the amount of pressure exerted on the cavity defining inner surface 56 is at or below a threshold pressure. According to another aspect of the present embodiment, the mechanochromatic material 10 is another color when the amount of pressure exerted on the cavity defining inner surface 56 is above a threshold pressure. In alternative embodiments, the mechanochromatic material 10 may change to one or more other colors when the amount of pressure exerted on the cavity defining inner surface 56 is above one or more other threshold pressures. In the present embodiment, the mechanochromatic material 10 is blue when the amount of pressure exerted on the cavity defining inner surface 56 is at or below the threshold pressure and red when the amount of pressure exerted on the cavity defining inner surface 56 is above the threshold pressure.

Figure 9:
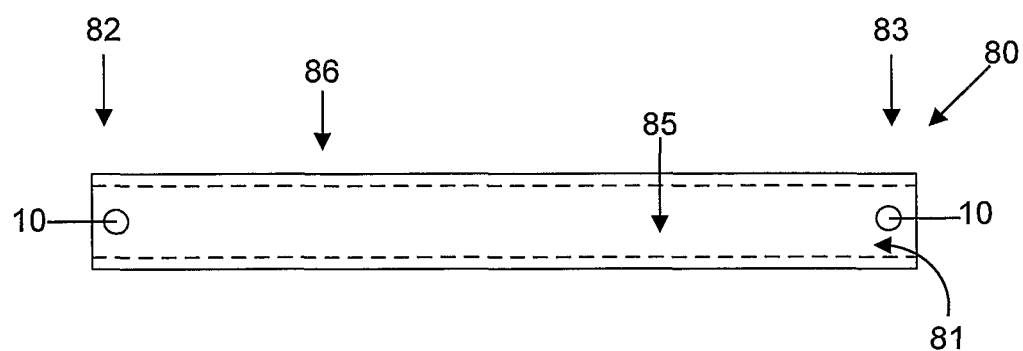
FIG. 9 depicts a side perspective view, of a conduit that includes a mechanochromatic material.

FIG. 9 depicts an alternative embodiment wherein the mechanochromatic material 10 is configured to function as a pressure indicator on a conduit 80. A conduit 80 is any structure through which a pressurized substance flows. By way of example, and not limitation, the conduit 80 may be a hose or a pipe. The conduit 80 may include a valve (not shown). The conduit 80 may, for example, and not limitation, be a component in a heating or air conditioning system, an oil system, a gas system, a water systems, or a chemical system.

In the present embodiment, the conduit 80 is provided with an inner surface 85 to be pressurized. As shown in FIG. 9, the conduit 80 is provided with an inner surface 85 that defines, at least in part, a cavity 81, which is pressurized. As shown in FIG. 9, the cavity 81 extends from a first end 82 of the conduit 80 to the second end 83 of the conduit 80. The first and second ends 82, 83 may, within the scope of the present invention, connect to one or more other structures, such as for example, and not limitation via threads (not shown), connectors (not shown), or clamps (not shown). It is within the scope of the present invention to provide the conduit 80 with a generally cylindrical shape, as shown, or with other shapes, such as, for example and not limitation, a T-shape, a Y-shape, an F-shape, or an elbow shape. Accordingly, it should be understood by those of ordinary skill in the art that the present embodiment is broadly directed at a conduit 80, regardless of its shape.

In the present embodiment, the mechanochromatic material 10 may be applied as a patch, a coating, a layer, a paint, or a plug, so long as the mechanochromatic material 10 may be viewed. The mechanochromatic material 10 may be provided with any shape, including, but not limited to, a circle, a band, an oval, a polygon, an irregular shape, a symbol, letter(s), or number(s). As shown, the conduit 80 may be provided with mechanochromatic material 10 located at each of the ends 82, 83. Furthermore, although in the present embodiment, the mechanochromatic material 10 is shown applied onto the outer surface 86 of the conduit 80, the scope of the present invention is not so limited. By way of example, and not limitation, the mechanochromatic material 10 may be located, at least in part, below the outer surface 86 of the conduit 80, including as a part of the inner surface 85, so long as the color change may be perceived. Furthermore, similar to the arrangements shown in FIGS. 3-8, with respect to tire 50, it is within the scope of the present invention to apply a non-mechanochromatic material 12, such as, for example, and not limitation, a coating of non-mechanochromatic material 12, above the mechanochromatic material 10 or to locate the mechanochromatic material 10 below a viewing window 13 included on the conduit 80, so long as a color change may be perceived. According to another aspect of the present embodiment, the conduit 80 may be extruded from the mechanochromatic material 10.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described above can be combined in various ways to form multiple variations of the invention. As a result, the invention is not limited to the specific examples described above, but only by the claims and their equivalents.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other embodiments, such as for example tires used in conjunction with inner tubes, such as, for example, and not limitation, bicycle tires, and not just to the embodiments described above and shown in the accompanying figures. Accordingly, the scope of the invention should be determined from the following claims.

We claim:

1. A tire (50), comprising:
   a pressurized inner surface (56);
   an outer surface (54); and
   a mechanochromatic material (10) formed as part of the tire (50) and that changes color according to a pressure of the tire (50), wherein the pressure places mechanical stress on the mechanochromatic material (10).

2. The tire (50) according to claim 1, wherein the mechanochromatic material (10) is located on the outer surface (54).

3. The tire (50) according to claim 1, wherein the mechanochromatic material (10) is applied as a patch, a plug, a coating, or a paint.

4. The tire (50) according to claim 1, wherein the mechanochromatic material (10) reversibly changes from one color to another when the amount of pressure exceeds a threshold pressure.

5. The tire (50) according to claim 1, wherein the mechanochromatic material (10) is located below the outer surface (59) of (50), located below a viewing window (13) included on the tire (50), or a non-mechanochromatic material (12) is applied above the mechanochromatic material (10).

6. The tire (50) according to claim 1, wherein the mechanochromatic material (10) changes color in response to shear stress or in response to normal stress.

7. A conduit (80), comprising:
   a pressurized inner surface (85);
   an outer surface (86); and
   a mechanochromatic material (10) formed as part of the conduit (80) and that changes color according to a pressure of the conduit (80), wherein the pressure places mechanical stress on the mechanochromatic material (10).

8. The conduit (80) according to claim 7, wherein the mechanochromatic material (10) is located on the outer surface (86).

9. The conduit (80) according to claim 7, wherein the mechanochromatic material (10) is applied as a patch, a plug, a coating, or a paint.

10. The conduit (80) according to claim 7, wherein the conduit (80) is extruded from the mechanochromatic material (10).

11. The conduit (80) according to claim 7, wherein the mechanochromatic material (10) reversibly changes from the color blue to the color red when the amount of pressure exceeds a threshold pressure.

12. The conduit (80) according to claim 7, wherein the mechanochromatic material (10) is located below the outer surface (86) of the conduit (80), is located below a viewing window (13) included on the conduit (80), or a non mechanochromatic material (10) is applied above the mechanochromatic material (10).

13. The conduit (80) according to claim 7, wherein the mechanochromatic material (10) changes color in response to shear stress or in response to normal stress.

* * * * *